(12) United States Patent
Ueno et al.

(10) Patent No.: US 6,714,752 B2
(45) Date of Patent: Mar. 30, 2004

(54) PROCESS CARTRIDGE, LOAD PRODUCING MEMBER AND ELECTROPHOTOGRAPHIC IMAGE FORMING APPARATUS

(75) Inventors: Takahito Ueno, Shizuoka-ken (JP); Atsushi Numagami, Kanagawa-ken (JP); Kazunari Murayama, Shizuoka-ken (JP); Shigeru Hoashi, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 09/984,173

(22) Filed: Oct. 29, 2001

(65) Prior Publication Data

US 2002/0057924 A1 May 16, 2002

(30) Foreign Application Priority Data

Oct. 31, 2000 (JP) .................................... 2000-333198
Oct. 26, 2001 (JP) .................................... 2001-329539

(51) Int. Cl.[7] .............................................. G03G 15/00
(52) U.S. Cl. ...................................................... 399/117
(58) Field of Search ................................ 399/111, 116, 399/117, 107, 112, 159, 167

(56) References Cited

U.S. PATENT DOCUMENTS

| 4,040,157 | A | * | 8/1977 | Shanly ........................ 399/117 |
| 4,936,697 | A | * | 6/1990 | Weller et al. |
| 5,023,660 | A | * | 6/1991 | Ebata et al. ................. 399/111 |
| 5,128,715 | A | * | 7/1992 | Furuyama et al. ........... 399/116 |
| 5,283,616 | A | | 2/1994 | Numagami et al. |
| 5,289,234 | A | | 2/1994 | Asano et al. |
| 5,436,699 | A | * | 7/1995 | Komaki ....................... 399/159 |
| 5,500,714 | A | | 3/1996 | Yashiro et al. |
| 5,543,898 | A | | 8/1996 | Shishido et al. |
| 5,585,895 | A | | 12/1996 | Yashiro et al. |
| 5,617,579 | A | | 4/1997 | Yashiro et al. ............... 399/114 |
| 5,678,125 | A | | 10/1997 | Kutsuwada et al. .......... 399/26 |
| 5,689,774 | A | | 11/1997 | Shishido et al. ............. 399/111 |
| 5,768,658 | A | | 6/1998 | Watanabe et al. ........... 399/111 |
| 5,790,923 | A | | 8/1998 | Oguma et al. ............... 399/106 |
| 5,845,175 | A | * | 12/1998 | Kumar et al. ............... 399/111 |
| 5,920,753 | A | | 7/1999 | Sasaki et al. ................ 399/111 |
| 5,923,924 | A | * | 7/1999 | Hashimoto ................... 399/111 |
| 5,966,566 | A | | 10/1999 | Odagawa et al. ........... 399/109 |
| 5,966,568 | A | | 10/1999 | Numagami et al. ......... 399/111 |
| 5,993,101 | A | * | 11/1999 | Kohno et al. ............... 399/116 |
| 6,006,058 | A | | 12/1999 | Watanabe et al. ........... 399/167 |
| 6,016,413 | A | | 1/2000 | Yokoyama et al. ......... 399/113 |
| 6,029,032 | A | | 2/2000 | Watanabe et al. ........... 399/111 |
| 6,035,159 | A | * | 3/2000 | Azuma et al. ............... 399/111 |
| 6,097,909 | A | | 8/2000 | Watanabe et al. ........... 399/111 |
| 6,101,354 | A | | 8/2000 | Nakagawa et al. ......... 399/225 |
| 6,118,960 | A | | 9/2000 | Nakagawa et al. ......... 399/111 |
| 6,167,219 | A | * | 12/2000 | Miyamoto et al. .......... 399/117 |

(List continued on next page.)

FOREIGN PATENT DOCUMENTS

| EP | 0 795 797 | 9/1997 |
| JP | 62-228715 | 10/1987 |
| JP | 4-8198 | 1/1992 |
| JP | 8-254867 | * 10/1996 |
| JP | 11-126010 | 5/1999 |
| JP | 2000-88013 | 3/2000 |

*Primary Examiner*—Susan S. Y. Lee
(74) *Attorney, Agent, or Firm*—Fitzpatrick, Cella, Harper & Scinto

(57) ABSTRACT

A process cartridge detachably mountable to a main assembly of an electrophotographic image forming apparatus includes an electrophotographic photosensitive drum; a process device actable on the electrophotographic photosensitive drum; and a load producing member for imparting a load on a peripheral surface of a cylindrical member rotatable with the photosensitive drum to increase a rotational torque required for rotation of the photosensitive drum.

27 Claims, 10 Drawing Sheets

U.S. PATENT DOCUMENTS

| | | | |
|---|---|---|---|
| 6,169,866 B1 | 1/2001 | Watanabe et al. | 399/111 |
| 6,188,858 B1 * | 2/2001 | Swapceinski et al. | 399/167 |
| 6,236,821 B1 | 5/2001 | Yokoyama et al. | 399/113 |
| 6,246,849 B1 | 6/2001 | Yokoyama et al. | 399/117 |
| 6,266,503 B1 | 7/2001 | Murayama et al. | 399/117 |
| 6,272,299 B1 | 8/2001 | Numagami et al. | 399/111 |
| 6,289,189 B1 | 9/2001 | Numagami et al. | 399/111 |
| 6,314,266 B1 | 11/2001 | Murayama et al. | 399/353 |
| 6,321,060 B1 * | 11/2001 | Nakayasu et al. | |
| 6,330,409 B1 | 12/2001 | Watanabe et al. | 399/111 |
| 6,381,429 B1 * | 4/2002 | Shibata et al. | 399/117 |

* cited by examiner

PROCESS CARTRIDGE, LOAD PRODUCING MEMBER AND ELECTROPHOTOGRAPHIC IMAGE FORMING APPARATUS

FIELD OF THE INVENTION AND RELATED ART

The present invention relates to a process cartridge detachably mountable to a main assembly of the electrophotographic image forming apparatus, a load producing member and an electrophotographic image forming apparatus.

Here, the electrophotographic image forming apparatus is an apparatus which forms images on recording materials through an electrophotographic image forming process. For example, it includes an electrophotographic copying machine, an electrophotographic printer (LED printer, laser beam printer or the like), an electrophotographic printer type facsimile machine, an electrophotographic printer type word processor and the like.

The process cartridge is a cartridge comprising as a unit at least one of process means such as charging means, developing means and cleaning means, and an electrophotographic photosensitive drum, the cartridge being detachably mountable to a main assembly of the electrophotographic image forming apparatus. The process means at least one of the charging means for electrically charging the photosensitive drum, developing means for developing an electrostatic latent image formed on the photosensitive drum, and cleaning means for removing a developer remaining on the photosensitive drum.

Heretofore, a process cartridge type is used, in which a cartridge comprising as a unit the electrophotographic photosensitive drum and at least one of the charging means, the developing means and the cleaning means, the cartridge being detachably mountable to the main assembly of the electrophotographic image forming apparatus.

The process cartridge type is advantageous because the maintenance operations for the process means can be, in effect, carried out by the user. Therefore, the operativity is significantly improved, and for this reason, the process cartridge type is widely used in the field of the electrophotographic image forming apparatus.

Recently, the demand for color electrophotographic image forming apparatus capable of forming color images increases.

In order to form high quality color images at high-speed with high operativity, a tandem type is used in which the photosensitive drums of the image formation stations for image formations in yellow Y, magenta M, cyan C and black K images, are juxtaposed with each other.

With this structure, the four color image formations are carried out independently to form a single color image. The positions of the image formed by the photosensitive drums may be deviated from the target (ideal) positions. In the following descriptions, the relative positional deviation among the different colors due to positional deviation from the target positions is called "color misregistration".

In the tandem type image forming apparatus, minimizing the color misregistration leads to image quality color image, and therefore, various measurements are taken.

For example, the positions of the image forming points for the respective colors are measured, and the positions are corrected; a rotary encoder is provided on the drum driving shaft to detect the rotation variation of the photosensitive drum, and control the driving motor in accordance with the detection so as to suppress the rotation variation.

As described hereinbefore, a plurality of process means in the form of a rotary member are provided around the photosensitive drum. In the case that peripheral speed of a rotatable member contacted to the photosensitive drum is higher than that of the photosensitive drum, the rotational speed of the photosensitive drum is unstable because the photosensitive drum is driven by the rotary member. In addition, if there is a member which is contacted to the photosensitive drum and which moves in the axial direction, the position, in the axial direction, of the photosensitive drum is unstable. Because of these factors, there is a liability that color misregistration results. Therefore, it is desired to provide means cable of suppressing the misregistration.

SUMMARY OF THE INVENTION

Accordingly, it is a principal object of the present invention to provide a process cartridge, a load producing member and an electrophotographic image forming apparatus with which the electrophotographic photosensitive drum can be stably rotated.

It is another object of the present invention to provide a process cartridge, a load producing member and an electrophotographic image forming apparatus with which the photosensitive drum can be rotated at a constant rotational speed even when the electrophotographic photosensitive drum is subjected to an external force.

It is a further object of the present invention to provide a process cartridge, a load producing member and an electrophotographic image forming apparatus with which the position, in the axial direction, of the photosensitive drum.

It is a further object of the present invention to provide a process cartridge, a load producing member and an electrophotographic image forming apparatus with which color misregistration in color image formation can be suppressed.

It is a further object of the present invention to provide a process cartridge, a load producing member and an electrophotographic image forming apparatus with which the rotation and position of the photosensitive drum are stabilized so as to produce high-quality color images giving the electrophotographic photosensitive drum is subjected to an external force.

Here, the external force which might be imparted to the photosensitive drum may be produced by a transfer drum (intermediary transfer belt) contacted to the photosensitive drum. Another example is uniforming means, contacted to the photosensitive drum and reciprocated in the longitudinal direction, for uniforming untransferred toner on the photosensitive drum.

It is a further object of the present invention to provide a process cartridge, a load producing member and an electrophotographic image forming apparatus to which the process cartridge is detachably mountable in which the torque required for rotating the photosensitive drum is increased by tightening on the peripheral surface of a member rotatable together with the electrophotographic photosensitive drum.

According to an aspect of the present invention, there is provided a process cartridge detachably mountable to a main assembly of an electrophotographic image forming apparatus, said process cartridge comprising an electrophotographic photosensitive drum; process means actable on said electrophotographic photosensitive drum; a load producing member for imparting a load on a peripheral surface of a cylindrical member rotatable with the photosensitive drum to increase a rotational torque required for rotation of said photosensitive drum.

According to another aspect of the present invention, there is provided a process cartridge detachably mountable to a main assembly of an electrophotographic image forming apparatus, said process cartridge comprising an electrophotographic photosensitive drum; process means actable on said electrophotographic photosensitive drum; a load producing member for tightening on a peripheral surface of a cylindrical member rotatable with the photosensitive drum to increase a rotational torque required for rotation of said photosensitive drum; said load producing member including a spring member extended around said peripheral surface for tightening on the peripheral surface of said cylindrical member, a contact portion, provided at one axial end of said load producing member, contacted to a flange which is provided at one end of said photosensitive drum, for rotation of said cylindrical member with said photosensitive drum; a thrust force producing portion, disposed at the other axial end of said load producing member, for imparting to said photosensitive drum a thrust force away from said load producing member in an axial direction of said photosensitive drum.

According to a further aspect of the present invention, there is provided a load producing member for increasing a torque required for rotating an electrophotographic photosensitive drum usable with an electrophotographic image forming apparatus, said load producing member comprising: a cylindrical member having a central through-hole through which a drum shaft of said photosensitive drum is penetratable; a spring member extended around a peripheral surface of said cylindrical member to tighten on the peripheral surface of said cylindrical member; a contact portion, provided that one axial end of said load producing element and contacted to a part of a flange provided at one end of said photosensitive drum, for rotation with said photosensitive drum; and a thrust force producing portion, provided at the other axial end of said load producing member, for imparting a thrust force to said photosensitive drum in an axial direction of said photosensitive drum away from said load producing member by contact to a part of a cartridge frame when said load producing member is mounted to a process cartridge.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
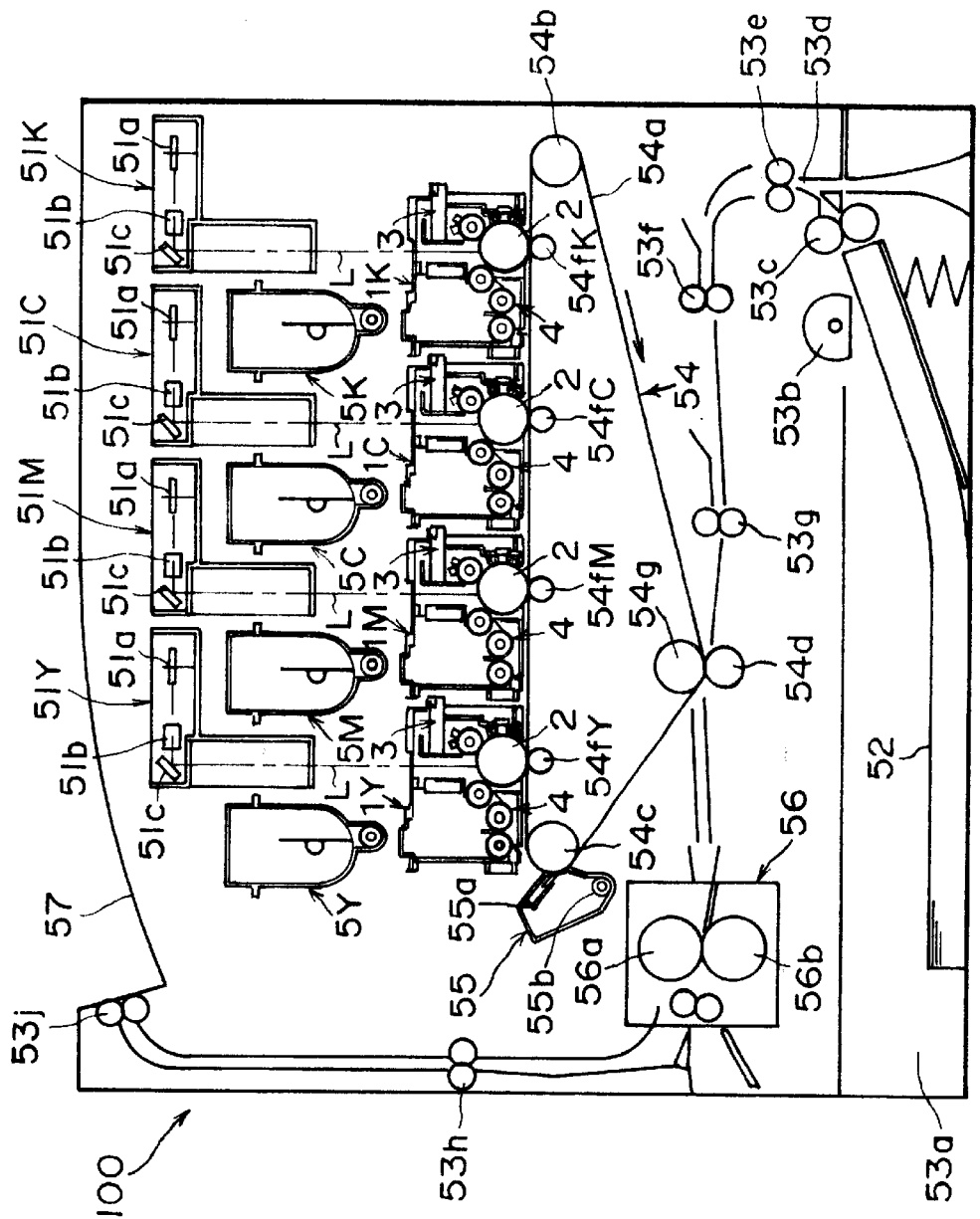
FIG. 1 is a sectional view of an electrophotographic type color image forming apparatus according to an embodiment of the present invention.

The description will be made as to a process cartridge, a load producing member and an electrophotographic image forming apparatus in conjunction with the accompanying drawings. In the following description, the longitudinal direction is a direction perpendicular to a feeding direction of the recording material, and is codirectional with the axis of an electrophotographic photosensitive member (photosensitive drum. When "left" and "right" are mentioned, they are as seen in the feeding direction of the recording material. When "upper", "top", "lower" and "bottom" are mentioned, they are as seen in a mounting direction of a process cartridge.

In the following description, the portions which are common except for the color, the reference characters "Y", "M", "C" and "K" are added to the reference numerals, and the detailed descriptions are omitted for simplicity, "Y", "M", "C" and "K" standing for yellow, magenta, cyan and black, respectively.

(Embodiment 1)

(General Arrangement of Image Forming Apparatus)

Referring to FIG. 1, the general arrangement of a color electrophotographic image forming apparatus according to an embodiment of the present invention will be described.

The color electrophotographic image forming apparatus of the embodiment is a color laser beam printer.

The color laser beam printer comprises image formation stations, which comprises process cartridges 1Y, 1M, 1C, 1K (for yellow color, magenta color, cyan color and black color, respectively) each of which includes a photosensitive drum 2, and laser exposure means (laser beam optical scanning systems 51Y, 51M, 51C, 51K corresponding to the respective colors and disposed above the process cartridges 1Y, 1M, 1C, 1K, respectively. The cartridge 1Y contains a yellow color development material; the cartridge 1M contains a magenta color developer; cartridge 1C contains a cyan color developer; and cartridge 1K contains a black color developer.

Below the image formation station, there are provided feeding means for feeding recording materials 52, an intermediary transfer belt 54a for transferring the toner image formed on the photosensitive drums 2, and a secondary transfer roller 54*d* for transferring the toner image from the belt 54*a* onto the recording material 52.

There are further provided fixing means for fixing 56 the transferred toner image on the recording material 52, and discharging means for discharging and stacking the recording materials 52.

The recording material 52 may be paper, an OHP sheet or textile.

The color laser beam printer of this embodiment comprises a cleaner-less system. In such a system, the untransferred toner remaining on the photosensitive drum 2 is taken up by the developing means, and therefore, the cleaner exclusively for removing and storing the untransferred toner is not provided in the process cartridge.

The description will be made as to Various parts of the image forming apparatus.

(Sheet Feeding Station)

The sheet feeding station functions to feed the recording materials 52 to the image formation station. The feeding portion comprises a feeding cassette 53*a* stacking a plurality of recording materials 52, a feeding roller 53*b*, a retarding roller 53*c* for preventing double feed, a feeding guide 53*d*, feeding rollers 53*e*, 53*f*, and registration rollers 53*g*.

The feeding roller 53*b* is rotated in accordance with an image forming operation to feed the recording materials 52 from the feeding cassette 53*a* in seriatim. The recording material 52 is guided by the feeding guide 53*d*, and is fed to the registration rollers by the feeding rollers 53*e*, 53*f*.

Immediately after the recording material 52 is fed to the registration rollers 53*g*, the registration rollers 53*g* are at rest. By the abutment of the recording material 52 to the nip formed between the registration rollers 53*g*, the inclination of the recording material 52 in the feeding is corrected. During the image forming operation, the registration rollers 53*g* rotate and the stop in a predetermined sequence to stop the recording material 52 and feed it toward the belt 54*a*. By this, the recording material 52 is aligned with the toner image in the subsequent step, that is, the transfer step.

(Process Cartridge)

In each of the process cartridges 1Y, 1M, 1C, 1K, charging means 3 and a developing means 4 are disposed around the photosensitive drum 2, and they are constructed as a unit. The cartridges 1Y, 1M, 1C, 1K are detachably mountable to the main assembly 100 of the apparatus through mounting means (unshown). The user can easily dismount the process cartridge, and therefore, the user exchanges the process cartridge when the service life of the drum 2 ends, for example.

In this embodiment, the number of rotations of the drum 2 is integrated, and the number reaches a predetermined level, the event that service life of the process cartridge is ending is notified to the user.

In this embodiment, the drum 2 is an organic photosensitive member having a negative charging property. It comprises a drum base member of aluminum having a diameter of approx. 30 mm, a normal photosensitive layer thereon, and an outermost surface layer which is a charge injection layer. It is rotated at a predetermined process speed, which is approx. 117 mm/sec in this embodiment.

The charge injection layer comprises a binder of insulative resin material and electroconductive fine particles which are, for example, ultra-fine particles of $SnO_2$, dispersed in the binder.

Figure 4:
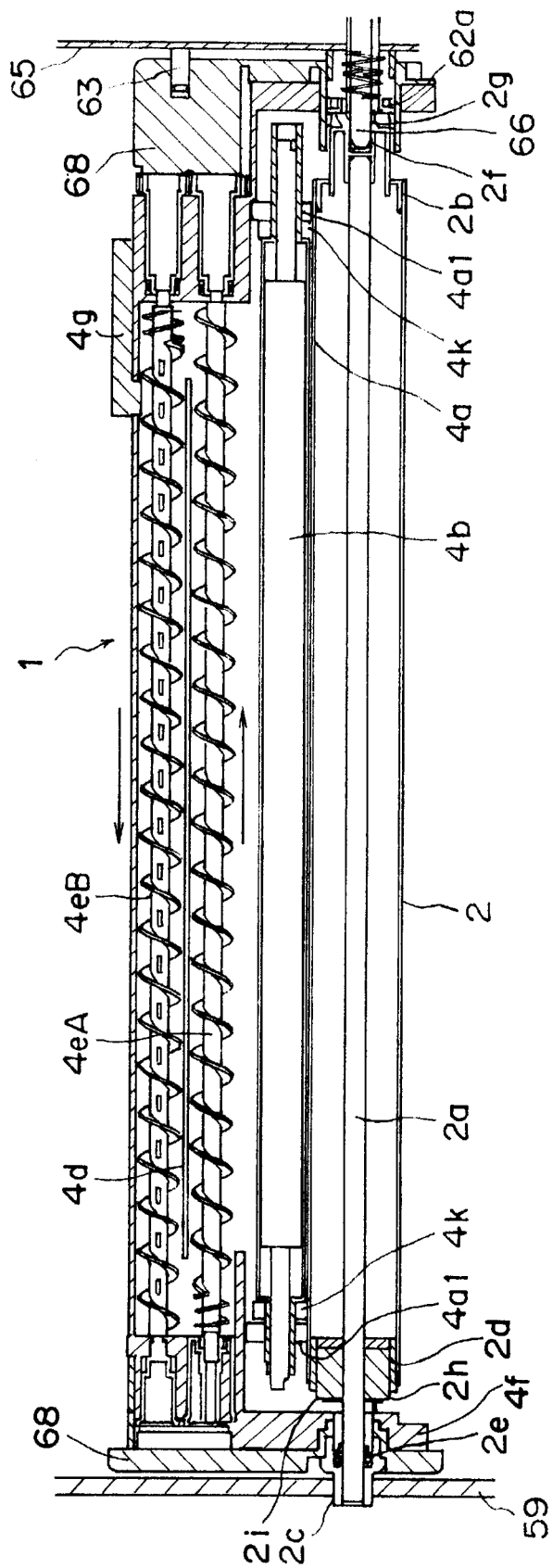
FIG. 4 is a longitudinal sectional view of a process cartridge according to an embodiment of the present invention.

As shown in FIG. 4, a drum flange 2*b* is fixed to the rear side end of the drum 2, and a non-driving flange 2*d* is fixed to the front side end. A drum shaft 2*a* penetrates the drum 2 at the centers of the flange 2*b* and the flange 2*d* drum shaft 2*a*, and the drum shaft 2*a*, the flange 2*b* and the flange 2*d* are rotatable all together. Namely, the drum 2 is rotated about an axis of the drum shaft 2*a*.

The front side end of the drum shaft 2*a* is rotatably supported on a bearing 2*c*. The bearing 2*e* is fixed to a bearing case 2*c*. The bearing case 2*c* is fixed to a frame 59 of the process cartridge. The drum shaft 2*a* functions to support the drum 2 on the cartridge frame 59.

(Charging Means)

Figure 2:
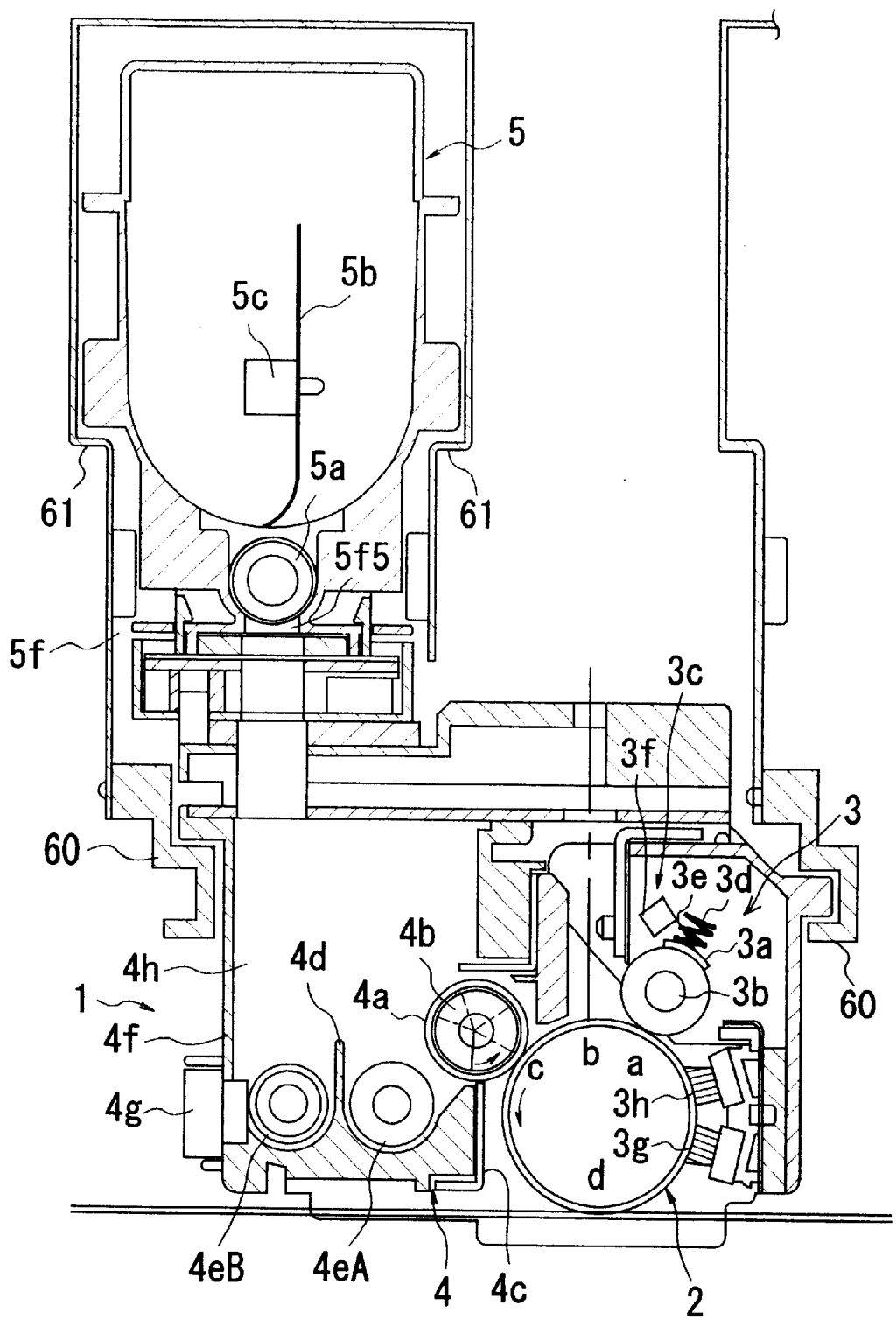
FIG. 2 is a sectional view of a developing device used in the color image forming apparatus shown in FIG. 1.
Figure 3:
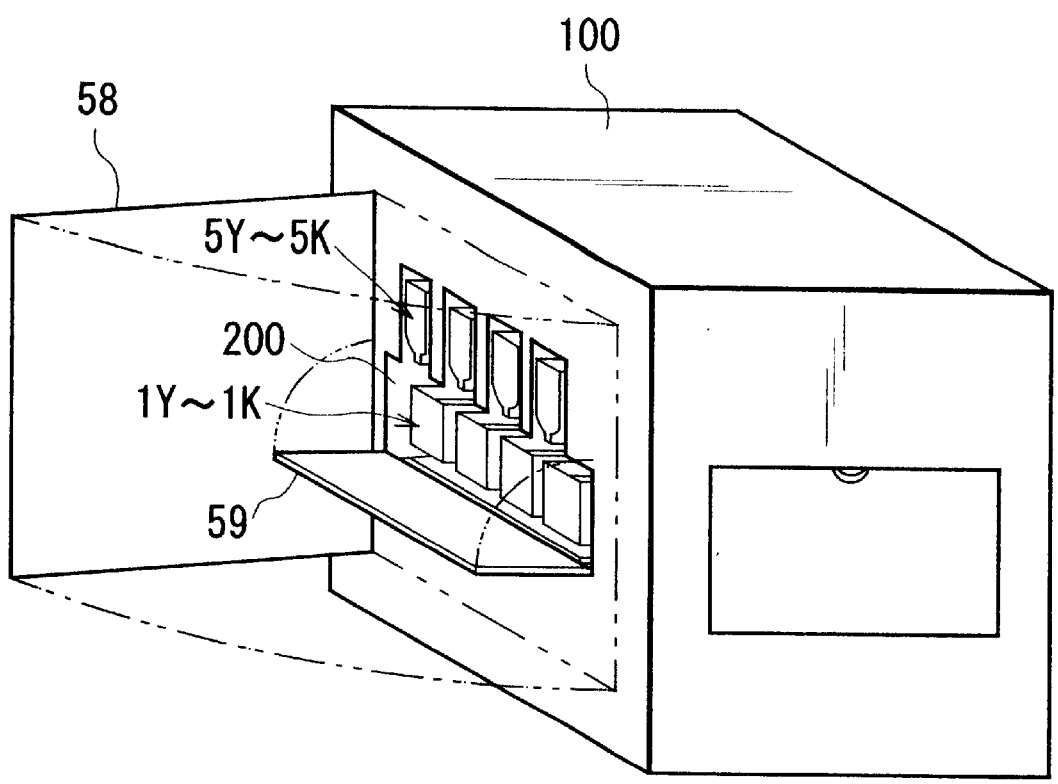
FIG. 3 is a perspective view of an outer appearance of the color image forming apparatus shown in FIG. 1, in which a front cover is opened.

The charging means 3 is of a contact charging type. In this embodiment, as shown in FIG. 2, the charge member is in the form of a charging roller 3*a*.

The charging roller 3*a* is rotatably supported by bearing member (unshown) at the opposite end portions of the core metal 3*b* thereof. It is urged toward the drum 2 by an urging spring 3*d* and is press-contacted to the surface of the drum 2 with a predetermined urging force. The roller 3*a* is driven by the rotation of the photosensitive drum 2.

There is provided a cleaning member 3*c* for cleaning the charging roller 3*a*. The cleaning member 3*c* of this embodiment comprises a flexible cleaning film 8*e* and a supporting member 3*f* supporting the cleaning film 3*e*. The film 3*e* is disposed in parallel with the longitudinal direction of the roller 3*a*. One end thereof is fixed to a reciprocable supporting member 3*f* which is reciprocable in the longitudinal direction through a constant distance. The film 3*e* cooperates with the roller 3*a* to form a contact nip adjacent the free end of the surface thereof. The supporting member 3*f* is reciprocation in a constant distance range in the longitudinal direction of the charging roller 3*a* by driving means (unshown) so that surface of the roller 3*a* is rubbed by the film 3*e*. By this, the deposited matter (fine particles toner, externally added material or the like) are removed from the surface of the charging roller.

(Cleaner-less System)

As described hereinbefore, the process cartridge of this embodiment uses the cleaner-less system. Referring to FIG. 2, the cleaner-less system will be described.

The description will first be made as to the general concept of the cleaner-less system in this embodiment. The residual toner remaining on the photosensitive drum 2 after the image transfer is carried to the developing zone c with the rotation of the photosensitive drum 2 by way of the charge portion an and the image exposed portion b. The untransferred toner is removed (collected) simultaneously with the development by the developing device 4.

The untransferred toner on the surface of the photosensitive drum 2 passes by the exposed portion b, and therefore, the surface of the drum 2 is exposed to the image light with the residual toner remaining on the surface. However, since the amount of the residual toner is small, there is no significant influence.

In this embodiment, uniforming means 8*g* for uniforming the untransferred toner (residual developer image) for uniforming the untransferred toner on the drum 2 at a position downstream of the transfer portion d with respect to the rotational direction of the drum 2. Moreover, toner (developer) charging control means 3*h* for uniformly charging the untransferred toner to the regular polarity (negative polarity in this embodiment) at a position downstream of the means 3*g* and upstream of the charge portion a with respect to the rotational direction of the drum 2.

Because of the provision of the means 3*g*, even if the amount of the untransferred toner which is carried from the transfer portion d to the means 3*h* and which might form a pattern on the photosensitive drum 2 is large, the toner is dispersed quite uniformly on the surface of the photosensitive drum into a non-pattern state. Therefore, the toner is not concentrated locally on the means 3h, and therefore, the charging control means 3h can always charge the whole untransferred toner to the regular polarity to a satisfactory extent. By doing so, the untransferred toner is effectively prevented from depositing on the charging roller 3a. The ghost image attributable to the untransferred toner image pattern can be avoided.

In this embodiment, the means 3g and the means 3h are brush-like member having a proper electroconductivity, and the brush portion thereof is contacted to the surface of the drum 2.

The means 3g and 3h move (rest rotate) in the longitudinal direction (axial direction) of the photosensitive drum 2 by a driving source (unshown). By doing so, the means 3g and the means 3h are not kept at the same positions on the drum 2. For example, even if there is an excessively charged portion or an insufficient charged portion, it does not occur at the same positions, at all times. Therefore, fusing of the untransferred toner on the drum 2 attributable to the local excessively charged untransferred toner and deposition of the untransferred toner onto the charging roller 3a due to the insufficient charging, can be avoided or suppressed.

(Exposure Means)

In this embodiment, the image exposure of the drum 2 is carried out using laser exposure means 51Y–51K as shown in FIG. 1. When an image signal is supplied from the main assembly of apparatus, a laser beam L modulated in accordance with the signal is scanningly protected on the surface of the photosensitive drum 2 which has been uniformly charged electrically. By this, an electrostatic latent image is formed on the surface of the drum 2 correspondingly to the image information.

The laser exposure means 51Y–51K comprises a solid laser element (unshown), a polygonal mirror 51a, an imaging lens 51b and a reflection mirror 51c. In response to the supplied image signal, the start light signal generator (unshown) controls the solid laser element (ON/OFF emission control at predetermined timing). The laser beam L emitted from the solid laser element is collimated substantially by a collimator lens system (unshown), and is deflected by a polygonal mirror 51a which is rotating at a high-speed. The beam is imaged as a spot on the photosensitive drum 2 through the imaging lens 51b and the reflection mirror 51c. In this manner, the surface of the drum 2 is scanned with the laser beam in the main scan direction by the deflection of the being and is also scanned therewith in the sub-scan direction by the rotation of the photosensitive drum 2, so that exposure distribution is provided in accordance with the image signal. More particularly, by the exposure and non-exposure of the drum to the laser beam, a pattern is formed by the light portion potential having a lowered surface potential and the dark portion potential. By the contrast between the light portion potential and the dark portion potential, an electrostatic latent image corresponding to the image information is formed.

(Developing Means)

The developing device 4 (developing means) in this embodiment is a two-component contact-type developing device (magnetic brush developing device). As shown in FIG. 2, it comprises a developing roller 4a and a magnet roller 4b therein. It further comprises a regulating blade 4c which is disposed with a predetermined gap relative to the developing roller 4a. With the rotation of the developing roller 4a in the direction indicated by the arrow, a thin layer of the developer is formed on the developing roller 4a.

As shown in FIG. 4, the small diameter portions (journal portions 4a1) at the opposite ends of the developing roller 4a is contacted by rotatable spacers 4k. By this, a predetermined gap is maintained between the developing roller 4a and the photosensitive drum 2. During the developing operation, the developer in the form of a layer on the developing roller 4a is contacted to the drum 2, while effecting the developing action. The developing roller 4a is rotated at a predetermined peripheral speed in the clockwise direction indicated by the arrow such that surface thereof moves counterdirectionally relative to the surface of the drum 2 at the developing zone c.

In this embodiment, the toner is a negative charged toner having an average particle size of 6 μm, and magnetic carrier has a saturation magnetization of 205 emu/cm 3 and having an average particle size of 35 μm. The developer comprises the toner and the carrier mixed at weight ratio 6:94.

In a developer accommodating portion 4h in the container 4d, the developer is circulated, and the developer accommodating portion 4h is partitioned by a partition 4d extending longitudinally except for the opposite end portions, into two parts. Stirring screws 4eA, 4eB are disposed with the partition 4d therebetween.

The toner supply from a toner supply container 5 disposed above the accommodating portion 4h, as shown in FIG. 4, falls to the rear side of the screw 4eB. Then, it is stirred while being fed toward the front side in the longitudinal direction, and passes through the partition 4d absent portions at the front side. It is further fed toward the longitudinally rear side by the screw 4eA adjacent to the developing roller 4a, and passes through the partition 4d absent portion at the rear side. The toner is stirred by the screw 4eB and repeats the circulation.

The description will be made as to a developing process for visualizing the electrostatic latent image formed on the drum 2 through the two component magnetic brush method by the developing device 4 and as to the developer circulation system.

With the rotation of the developing roller 4a, the developer in the developing container 4f is taken up on the surface of the developing roller 4a by the tape-up magnetic pole of the magnet roller 4b, and the developer is carried. During the caring process, the layer thickness of the developer is regulated by a regulating blade 4c disposed perpendicularly to the surface of the developing roller 4a. The thin layer of the developer is formed on the developing roller 4a. When the thin layer developer reaches a developing pole which is disposed corresponding to the developing zone c, chains of the developer are erected by the magnetic force. The electrostatic latent image formed on the surface with the drum 2 is developed into a toner image with the toner contained in the developer which is formed into chains. In this embodiment, the electrostatic latent image is developed through a reverse development process.

The thin layer developer on the developing roller 4a having passed through the developing zone c enters back to the container 4f with the rotation of the developing roller 4a. By repelling magnetic field of feeding pole, the developer becomes apart from the developing roller 4a and returns to a developer accumulated portion in the container 4f.

The developing roller 4a is supplied with a DC voltage and an AC voltage from a voltage source (unshown). In this embodiment, it is supplied with a DC voltage of −500V and an AC voltage having a frequency of 2000 Hz and a peak-to-peak voltage of 1500 Vpp, so that toner is deposited selectively on the exposed portion of the photosensitive drum 2.

When the toner is consumed the developing operation, the toner content in the developer lowers. In this embodiment, a toner content sensor 4g for detecting the toner content is disposed in the proximity to the outer surface of the screw 4eB. When the sensor 4g detects the event that toner contact lowers beyond the predetermined level, the instructions that toner is to be supplied from a supply container 5 into the developing device 4 are produced. By the toner supply operation, the toner content of the developer is always maintained at a predetermined level.

(Toner Supply Container)

As shown in FIG. 1, the toner supply containers 5Y, 5M, 5C, 5K are disposed of the respective cartridges 1Y, 1M, 1C, 1K, and are juxtaposed with each other. They are mounted to the apparatus through the front side of the main assembly 100 of the apparatus.

As shown in FIG. 2, in the supply container 5, there are provided a stirring shaft 5c, a stirring plate 5b and a screw 5a which are fixed to the stirring shaft 5c. The bottom side of the container is provided with a toner discharging opening 5f for permitting discharge of the toner.

Figure 5:
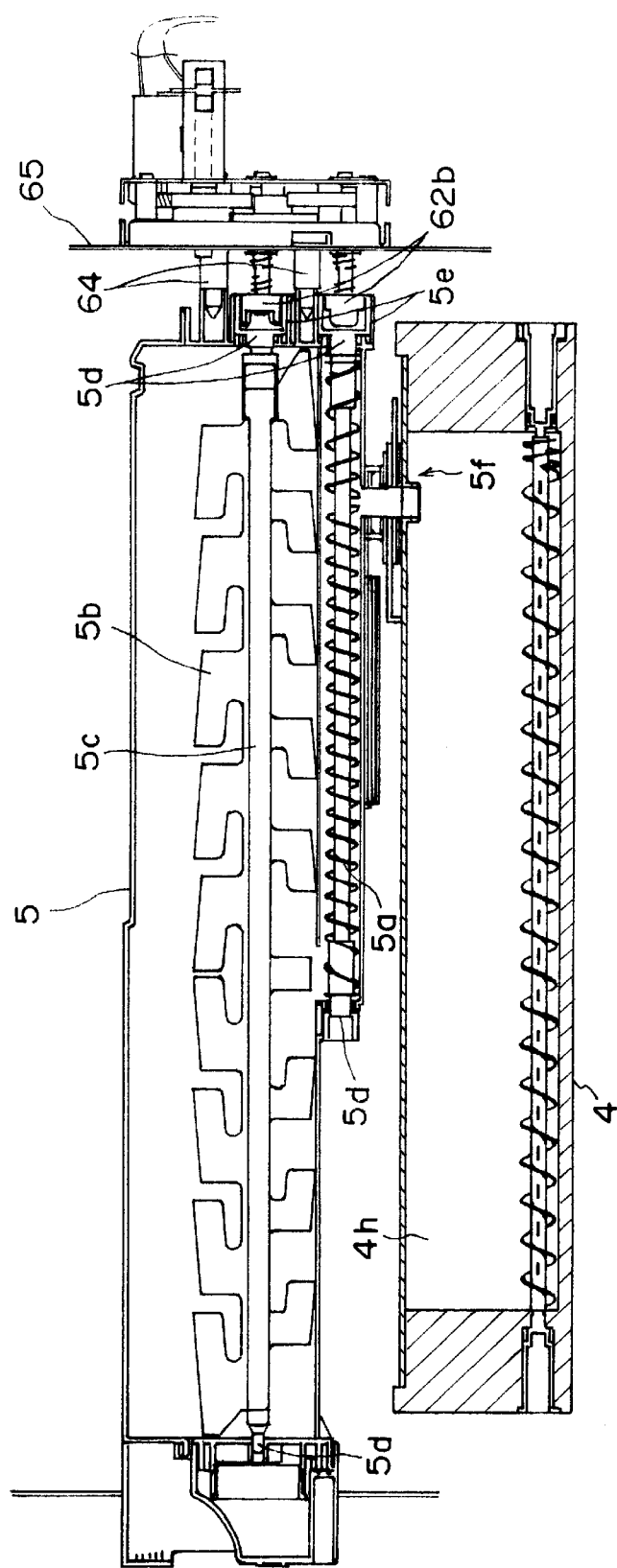
FIG. 5 is a longitudinal sectional view of a toner supply container according to an embodiment of the present invention.
Figure 6:
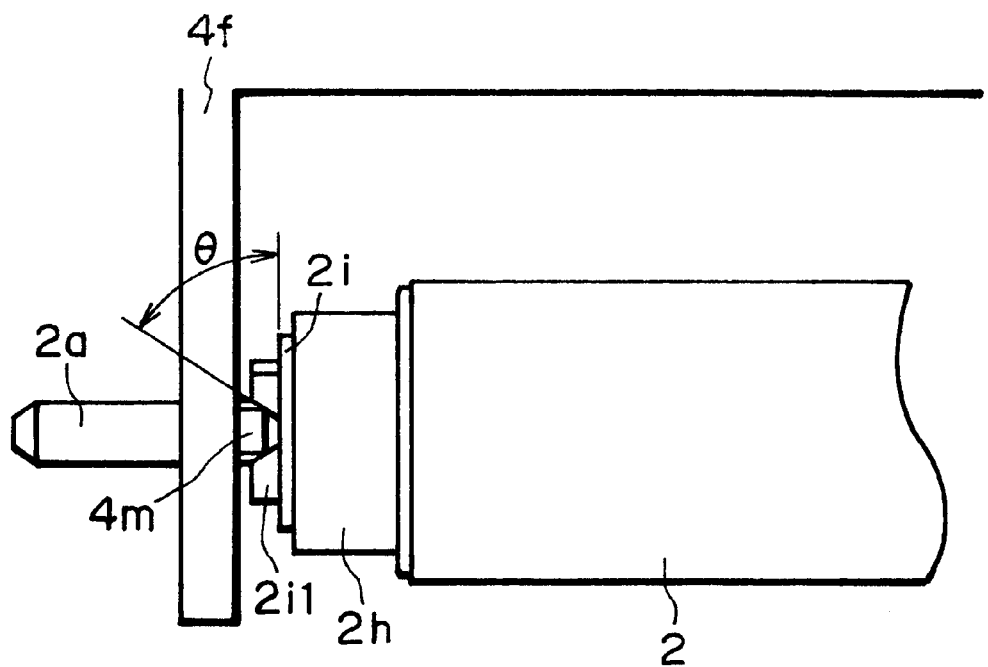
FIG. 6 is a side view of a major portion of the photosensitive drum according to an embodiment of the present invention.
Figure 7:
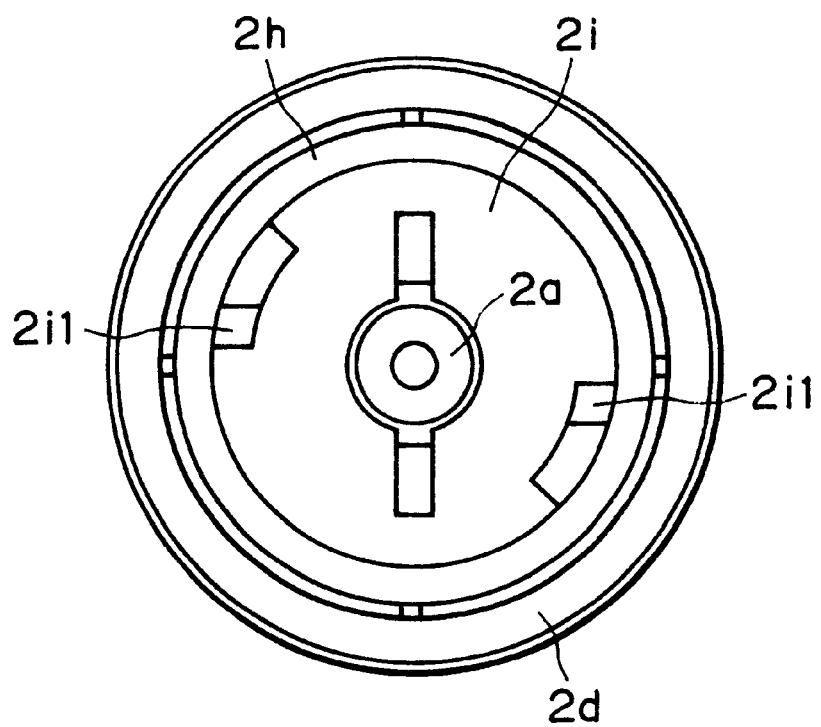
FIG. 7 is a front view of the photosensitive drum shown in FIG. 6.
Figure 8:
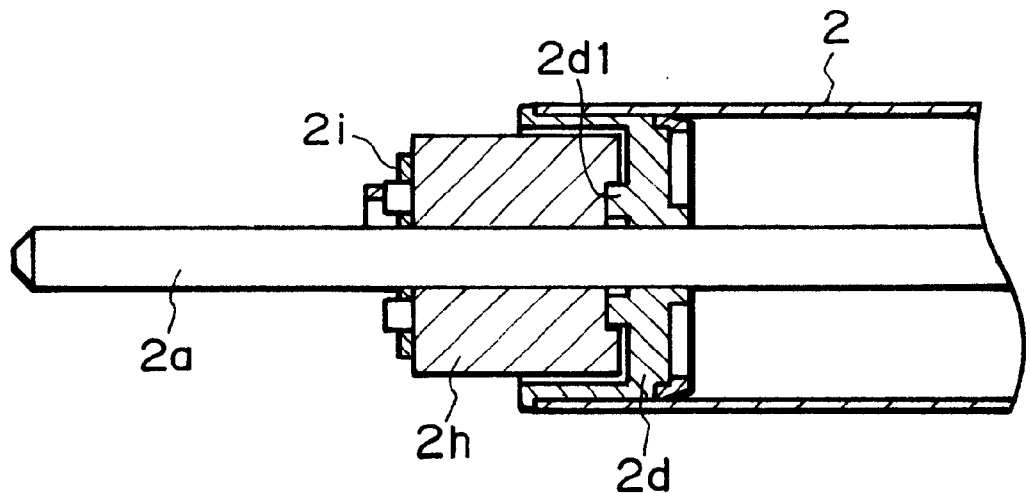
FIG. 8 is a sectional view of the photosensitive drum shown in FIG. 6.

As shown in FIG. 5, the screw 5a and the shaft 5c are rotatably supported by bearings 5d at the opposite end portions. At one of the end portions, there is provided a driving coupling 5e having a recess. The coupling 5e is engageable with a driving coupling 62b in the form of a projection, provided in the main assembly 100 of apparatus to receive a rotational driving force. The outer portion of the screw 5a has a helical rib.

By the rotation of the driving coupling 62b, the screw 5a is rotated in a predetermined rotational direction. The toner is fed toward the discharging opening 5f and is let fall through the opening 5f to be supplied into the process cartridge 1.

The end portion, in the radial direction, of the stirring plate 5b is tapered. When it rubs the wall surface of the supply container 5, the end portions are contacted at an angle. More particularly, the end portion of the stirring plate 5b is twisted into a helical shape. By the helical inclination of the end portion of the stirring plate 5b, the feeding force is produced in the axial direction so that toner is fed in the longitudinal direction.

The supply container 5 of this embodiment is capable of supplying the developer into the process cartridge or into a developing cartridge irrespective of whether the developing method is a two component developing method or a one component developing method. The powder accommodated in the supply container is not limited to the toner, but it may be a mixture of the toner and the magnetic carrier (developer).

(Transfer Means)

An intermediary transfer unit 54 (transferring means) effects a secondary transfer onto the recording material 52 in which the plurality of toner image transfer and superimposed sequentially from the drum 2 (primary transfer), are transferred onto the recording material 52 all at once.

The intermediary transfer unit 54 has an intermediary transfer belt 54a which travels in the direction indicated by the arrow in FIG. 1, and it moves at a peripheral speed which is slightly higher than the outer peripheral speed of the photosensitive drum 2 in the clockwise direction in this Figure. The belt 54a, in this embodiment, is an endless belt having a circumferential length of approx. 940 mm, and are extended around three rollers, namely, a driving roller 54b, a secondary transfer opposing roller 54g and a follower roller 54c.

Within the movement path of the belt 54a, there are disposed transfer charging rollers 54fY, 54fM, 54fC, 54fK at positions corresponding to the associated photosensitive drums 2, respectively. They are rotatable and are urged toward the center of the photosensitive drum 2.

The transfer charging rollers 54fY, 54fM, 54fC, 54fK are supplied with electric energy from a high voltage source (unshown), by which the electric charging is effected to the backside of the belt 54a to the polarity opposite from that of the toner, so that toner image on the photosensitive drum 2 is gradually transferred onto the upper surface of the belt 54a (primary transfer).

In the secondary transfer position, a secondary transfer roller 54d (transferring member) is provided at a position opposed to a secondary transfer opposing roller 54g, and is press-contacted to the belt 54a. The secondary transfer roller 54d is movable in a vertical direction in the Figure and is rotatable.

The belt 54a and the roller 54d are driven, respectively. When the recording material 52 enters the secondary transfer portion, a predetermined bias is applied to the roller 54d, so that toner image on the belt 54a is transferred all together to the recording material 52 (secondary transfer).

At this time, the recording material 52 sandwiched by them is moved toward the left in the Figure at a predetermined speed while it is in the process of the image transfer. It is then fed to a fixing device 56 where it is subjected to the next step.

At the most downstream position of the belt 54a, there is provided a cleaning unit 55 which is movable toward and away from the surface of the belt 54a. It functions to remove the untransferred toner which remains after the secondary transfer.

In the unit 55, cleaning blade 55a is provided to remove the untransferred toner. The unit 55 is swingable about a center (unshown). The blade 55a is press-contacted as if it bites into the belt 54a. The untransferred toner now in the unit 55 is fed by a feeding screw 55b to a removed toner container (unshown) where it is stored.

The belt 54a is of polyimide resin material. However, the material is not limited to the polyimide resin material, and another material such as plastic resin material such as polycarbonate resin material or rubber such as fluorine or silicon rubber material are suitably usable.

(Image Fixing Station)

The toner image formed on photosensitive drum 2 by the developing means 4 is transferred onto the recording material 52 through the belt 54a. The fixing device 56 fixes the toner image having been transferred onto the recording material 52 on the recording material 52 by heat.

As shown in FIG. 1, the fixing device 56 comprises a fixing roller 56a for applying the heat to the recording material 52, and a pressing roller 56b for press contacting the recording material 52 to the fixing roller 56a. These rollers are hollow rollers, and contains therein heaters (unshown), respectively. They are rotated so as to feed and fix the recording material 52.

The recording material 52 having the transfer toner image is fed by the roller 56a and the roller 56b, and is supplied with heat and pressure. By this, the toner image is fixed on the recording material 52. After the image fixing operation, the recording material 52 is discharged by discharging rollers 53h, 53j and is stacked on a tray 57 provided at the top of the main assembly 100 of the apparatus.

(Mounting of Process Cartridge and Toner Supply Container)

Referring to FIGS. 2–5, the description will be made as to the mounting process of the process cartridge and the toner supply container.

The front side of the main assembly 100 of the apparatus is provided with a front door 58. When the front door 58 is open by pulling it toward the front side, an opening 200 for permitting insertion of the process cartridges 1Y–1K and the supply containers 5Y–5K are exposed.

In the opening 200, a rotatably supported supporting plate 59 is disposed. When the cartridge 1Y–1K is mounted or demounted, the plate 59 is opened first.

In the main assembly 100 of the apparatus, there are provided a guiding rail 60 for guiding the mounting of the cartridge 1 and a guiding rail 61 for guiding the mounting of the supply container 5.

The mounting directions of the cartridge 1 and the supply container 5 are parallel with the axial direction of the photosensitive drum 2. The guiding rails 60, 61 are extended in the same direction. The cartridge 1 and the supply container 5 are inserted from the front side toward the rear side in the main assembly 100 of apparatus along the guiding rails 60, 61.

When the cartridge is inserted into the most rear portion, a shaft 66 of the main assembly 100 of the apparatus is engaged with the center hole 2f of the flange 2b. By this, the center of rotation position of the drum 2 at the rear side is correctly determined relative to the main assembly of apparatus. Simultaneously therewith, a driving force transmitting portion 2g formed on the flange 2b and a driving coupling 62a in the form of a projection are coupled with each other to permit rotational driving of the drum 2.

Furthermore, the later side plate 65 is provided with a support pin 63 for positioning the cartridge 1. The support pin 63 is inserted into the frame 68 of the cartridge 1 by which the position of the frame 68 of the cartridge 1 is fixed.

At the front side of the main assembly 100 of the apparatus, there is a rotatable aligning plate 59, and a bearing case 2c of the cartridge 1 is fixed to the plate 59. Through the sequential inserting operation described above, the cartridge 1, together with the drum 2, is correctly positioned relative to the main assembly 100 of the apparatus.

On the other hand, when the supply container 5 is inserted to the most rear portion, it is fixed to a support pin 64 provided projected from the rear side plate 65. Simultaneously therewith, a driving coupling 5e having a recess and a driving coupling 62b in the form of a projection are coupled with each other so as to enable driving of the screw 5a and the stirring shaft 5c.

(Stabilization of Drum Rotation and Drum Position in the Thrust Direction)

Referring to FIGS. 4, 6, 7, 8, the description will be made as to the structure for stabilizing the rotation of the photosensitive drum and the position thereof in the thrust direction.

The drive transmission structure for the photosensitive drum unit will first be described.

As described hereinbelow, the shaft 66 of the main assembly 100 of the apparatus is inserted into the center hole 2f of the flange 2b, so that the center of rotation at the rear side of the drum 2 is correctly positioned relative to the main assembly 100 of the apparatus. Simultaneously therewith, a driving force transmitting portion 2g and a driving coupling 62a are coupled with each other to enable rotation of the photosensitive drum 2. The drive transmission for the drum is not limited to the structure using the coupling, but gears, for example, are usable. On the other hand, a non-driving side flange 2d fixed to a front side end (one end) of the drum 2 is recessed. A rib 2d1 is formed in the flange 2d at the bottom portion of the recess. One end of a load producing member 2h for applying a predetermined load against rotation of the drum 2 is press-fitted to the rib 2d1, at one end of the load producing member 2h. With this arrangement, the load producing member 2h is coupled and fixed to the flange 2d. To the other end, that is, the non-driving side of the load producing member 2h, a thrust urging member 2i, which is a thrust force producing members, is fixed. The member 2i is provided with a tapered portion 2i1 in the form of a rib at a symmetrical and equidistant position with respect to the drum 2a.

A wall portion (cartridge frame) of the developing container 4f facing the portion 2i1 is provided with a locking rib 4m projected from the wall.

When the drum 2 is rotated by the driving force received from the main assembly 100 of the apparatus through a transmitting portion 2g, the tapered portion 2i1 is brought into engagement with the locking rib 4m. With this arrangement, the rotational force for the photosensitive drum 2 is used as a driving force for the photosensitive drum 2 in the thrust direction, so as to urge the photosensitive drum 2 toward the driving side.

The thrust force can be selected by selecting the angle θ of the taper of the tapered portion 2i1. In this embodiment, the taper angle θ is approximately 56°, and the load in the rotational direction ranges between 400–800 f (4–8 N). By this, the load variation rate is not more than 10%. In this case, the thrust force is approximately 70% of the load in the rotational direction, that is the thrust force ranges between 280–560 f (2.8–5.6 N).

With this structure, during the rotation of drum 2, the torque and the thrust force produced are stabilized at all times. Therefore, the rotation of the drum 2 is stable, and the position of the drum 2 in the thrust direction is also stable. Accordingly, the image printed on the recording material 52 involves less color misregistration in the feeding direction (sub-scanning direction) and in the direction (main scan direction) perpendicular to the feeding direction (sub-scan direction). Even when the drive transmitting portion 2g and the driving coupling 62a are not properly engaged due to the press-contact between the shaft 66 and the center hole 2f of the flange 2b, the engagement between the portion 2i1 and the locking rib 4m is effective to produce the urging force for the drum 2 in the thrust direction. As a result, the shaft 66 is inserted into the center hole 2f to provide a proper engagement between the transmitting portion 2g and coupling 62a to establish proper drive transmission.

Figure 9:
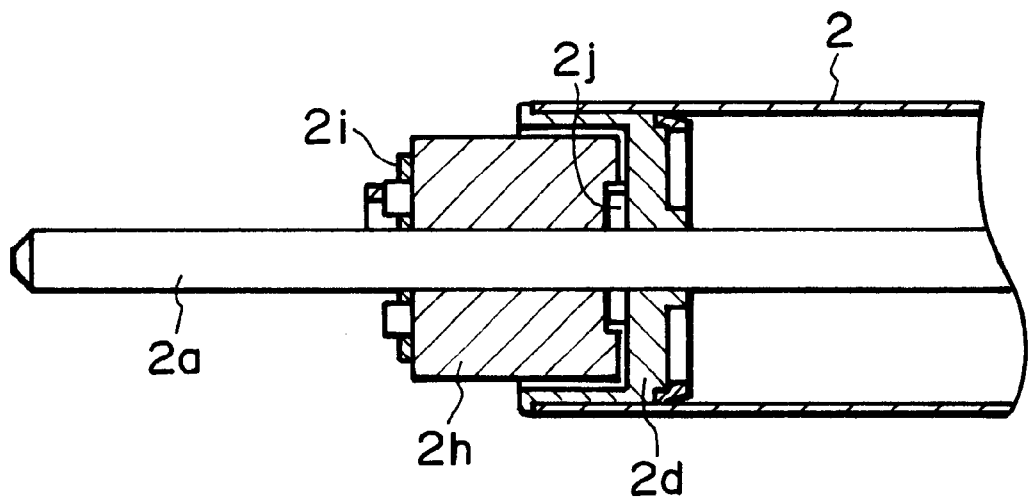
FIG. 9 is a sectional view of a photosensitive drum which is a modified from that shown in FIG. 8.

It is not inevitable that load producing member 2h is fixed to the flange 2d. As shown in FIG. 9, for example, parallel pins 2j may be planted in the drum shaft 2a (rotation supporting member) to extend in the direction perpendicular to the axis of the drum shaft 2a, and the load producing member 2h is fixed to the parallel pins 2j. The structure provides the same effects.

Figure 10:
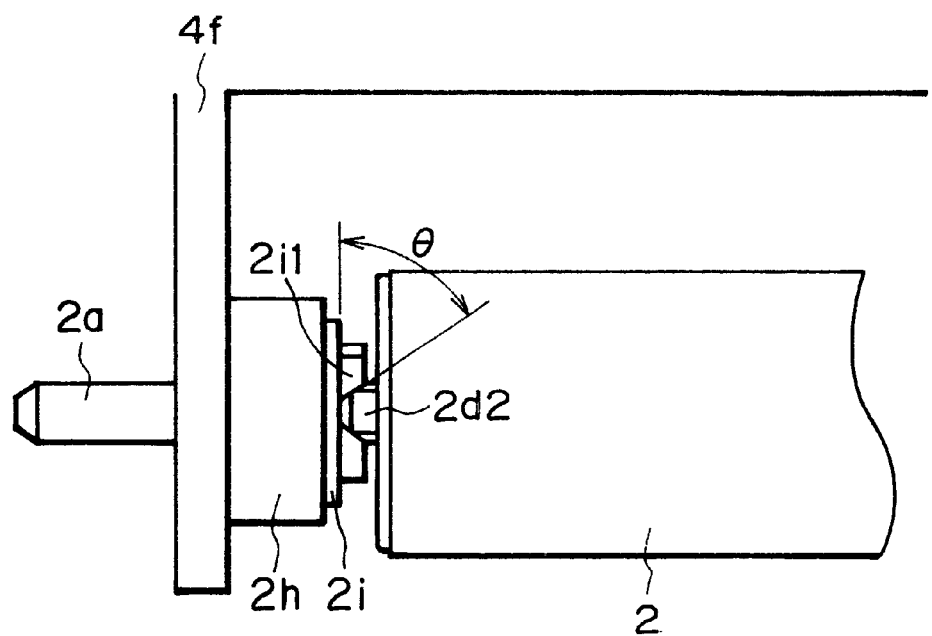
FIG. 10 is a sectional view of a photosensitive drum according to another modification in which there is provided a means for stabilization of rotation and thrust direction position.

Furthermore, as shown in FIG. 10, the developing container 4f in the form of a cartridge frame may be provided with the load producing member 2h, the thrust urging member 2i, and the tapered portion 2i1, and the locking rib 2d2 is fixed to the drum flange 2d. The structure also provides the same effects.

Figure 11:
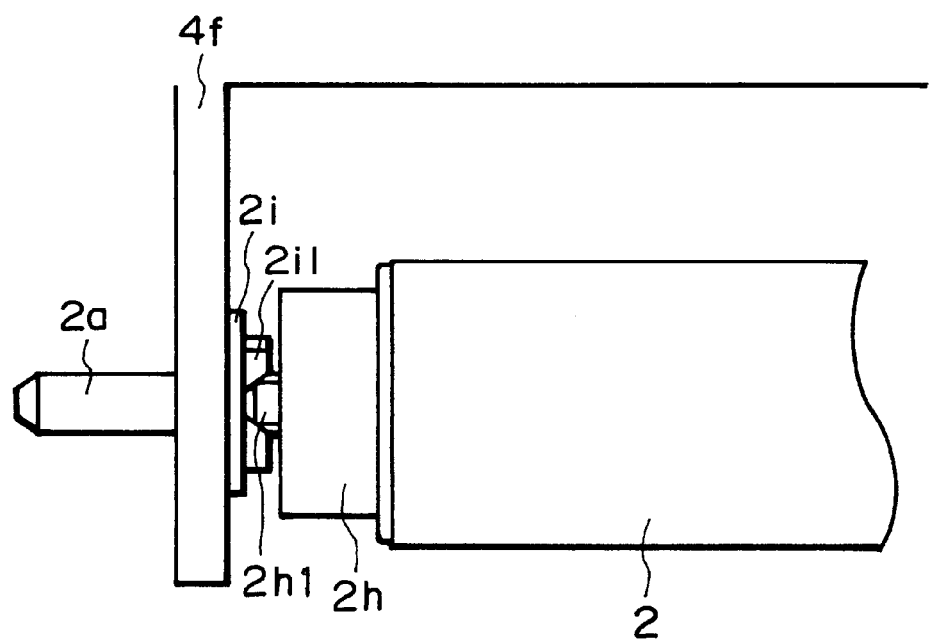
FIG. 11 is a sectional view of a modified photosensitive drum in which the rotation and the thrust direction position are stabilized.

As shown in FIG. 11, the flange 2d of the drum 2 is provided with the load producing member 2h. And, a locking rib 2h1 is mounted to the member 2h, and a thrust urging member 2i provided with the tapered portion 2i1 on the developing container 4f facing them. The portion 2i and the locking rib 2h1 are engaged. The same effects are provided by the structure.

Similarly, a locking rib 2h1 is provided in the member 2h provided in the developing container 4f. The flange 2d of the drum 2 opposed to the locking rib 2h1 is provided with the thrust urging member 2i having the portion 2i1. The locking rib 2h1 and the portion 2i1 are engaged with each other. This is a further alternative.

Figure 12:
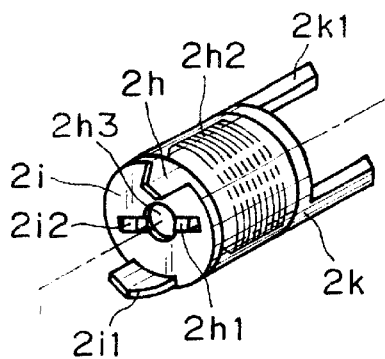
FIG. 12 is a perspective view of a load producing member according to an embodiment of the present invention.
Figure 13:
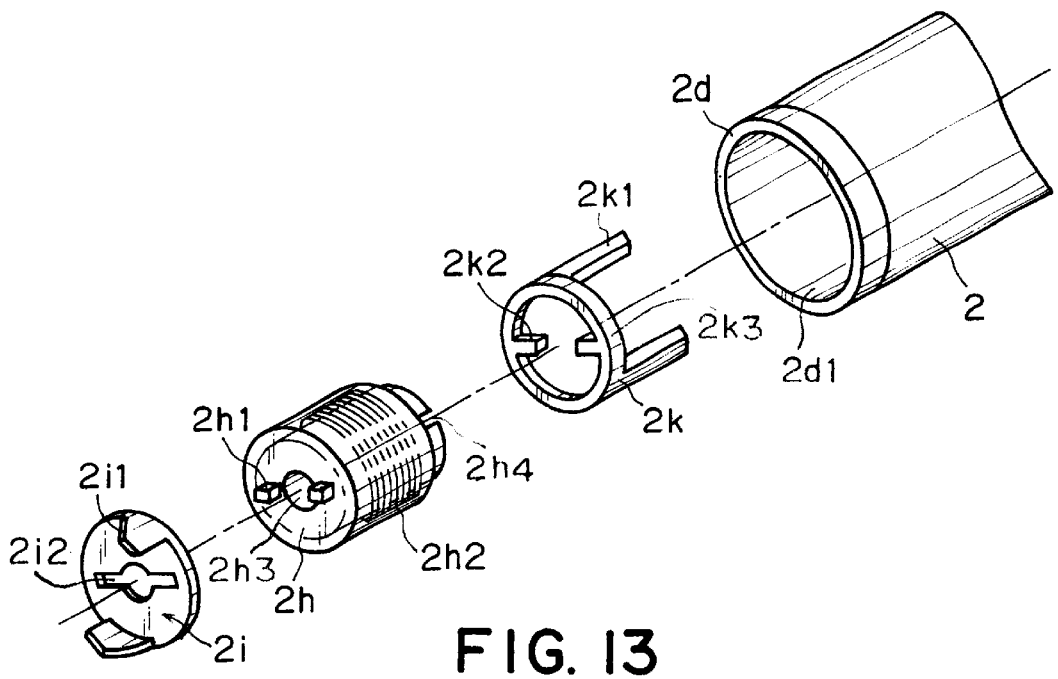
FIG. 13 is an exploded perspective view of a non-driving side of a photosensitive drum provided with the load producing member according to an embodiment of the present invention.
Figure 14:
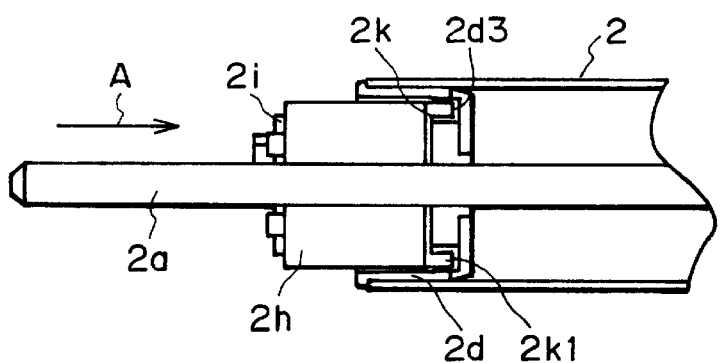
FIG. 14 is a sectional view of a photosensitive drum according to an embodiment of the present invention.
Figure 15:
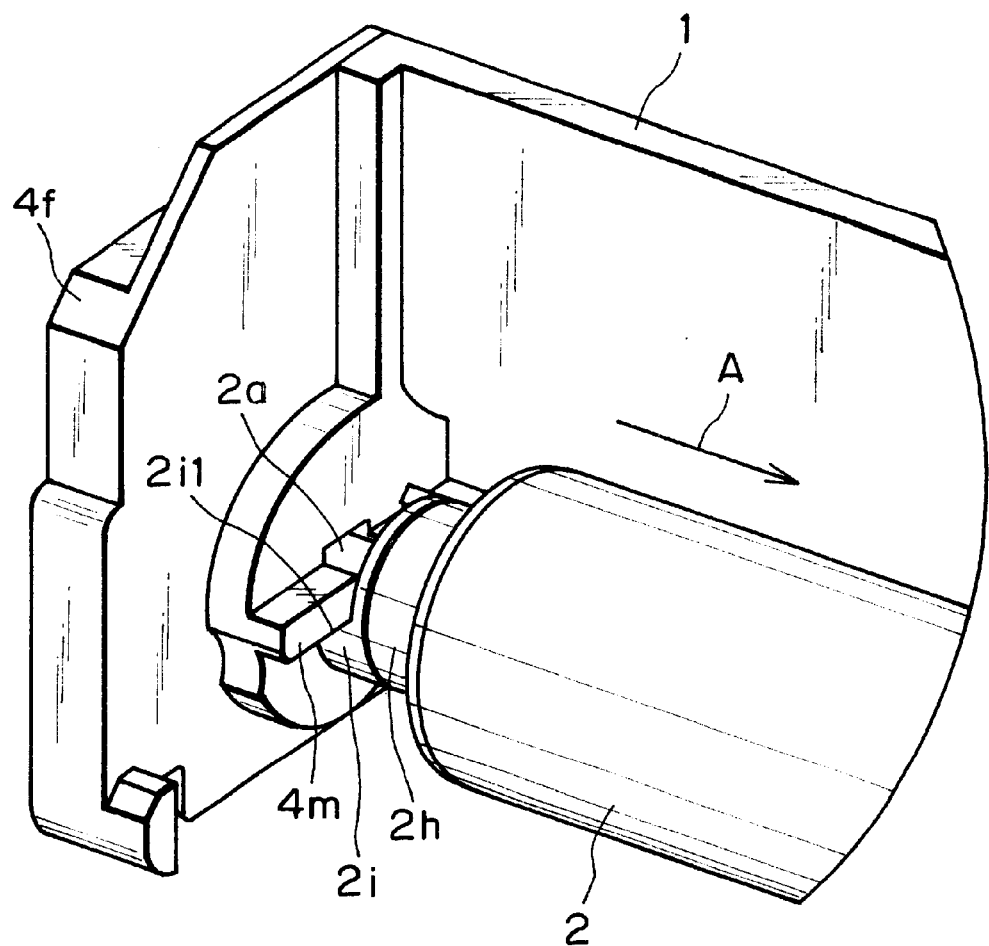
FIG. 15 is a perspective view of a non-driving side of the photosensitive drum provided with the load producing member according to an embodiment of the present invention.

Referring to FIGS. 12, 13, 14 and 15, the description will be made in more detail. FIGS. 12 and 13 are a perspective view of the load producing member and an exploded perspective view. FIG. 14 is a sectional view of 1 end portion of the drum 2. FIG. 15 is a perspective view in which the drum 2 is mounted to the cartridge 1, and the thrust force is produced.

In this embodiment, a coupling 2k, a housing, and a thrust force producing member 2i are mounted to the load producing member 2h, by which the entirety of this structure forms a load producing unit. The load producing member 2h comprises a cylindrical member having a through hole 2h3 which is penetrated by the drum shaft 2a, and a coil spring member 2h2 extending around the circumferential surface of the cylindrical member, for tightening on the peripheral surface of the cylindrical member. By the elastic force of the spring member 2h2, a frictional force is imparted on the outer surface of the cylindrical member by the spring member 2h2. In FIG. 13, the portion of the spring member 2h2 indicated by the chain line tightens on the cylindrical member. The spring member 2h2 clenches the peripheral surface of the cylindrical member with substantially a constant tightening force. An axial end of the member 2h is provided with a coupling 2k. The position of the coupling 2k relative to the cylindrical member is determined by locking a rib 2k2 of the coupling 2k into a cut-away portion 2h4 of the member 2h. The inner diameter 2k4 of the coupling 2k is such that end 2h5 of the cylindrical member is in press-fitted engagement with the coupling 2k by which the coupling 2k is mounted to the cylindrical member. The coupling 2k is provided with a contact portion 2k1 which is engaged with the inner surface 2d2 of the flange 2d provided at one end of the drum 2, and is abutted (locked) to a part of the flange 2d, by which the rotation is prevented. By doing so, the cylindrical member rotates together with the drum 2.

The contact portion 2k1 is projected in the axial direction from the circular portion 2k3 press fitted into one end of the cylindrical member. A free end of the contact portion 2k1 is locked (engaged) into a hole 2d3 of the flange 2d. By doing so, the coupling 2k is rotatable integrally with the drum 2. Thus, the cylindrical member is rotatable integrally with the drum 2. The coupling 2k loosely and removably fits into the drum 2 (flange 2d). In other words, the contact portion 2k1 is engaged with the inner surface of the flange 2d with a gap therebetween.

In summary, the member 2h comprises a metal cylindrical member and a spring member 2h2 wound around the outer surface of the cylindrical member. The housing is provided around the spring member 2h2. The housing is rotatable independently from the cylindrical member. One end and the other end of the spring member 2h2 is mounted to the housing. One cylindrical member is provided with a coupling 2k mounted thereto. One end of the cylindrical member is locked to the drum 2 through the coupling 2k. By doing so, the cylindrical member is rotatable integrally with the drum 2. The rotation of the housing is limited by the cartridge frame through the thrust force producing portion 2i. The housing is provided with a thrust force producing portion 2i mounted thereto. The thrust force producing portion 2i is abutted to a part of the cartridge frame and imparts a force in the thrust direction to the drum 2. The thrust force producing portion 2i is disposed at the other end with respect to the axial direction of the member 2h. The thrust direction is oriented toward the end opposite from the end where there is provided the member 2h, with respect to the direction of the axis of the drum 2. That is, the orientation is toward the end where there is provided a coupling which is a driving force receiving member for rotating the drum 2. The thrust force producing portion 2i is in the form of an inclined portion 2i1 which is inclined relative to the rotational direction. When the drum 2 rotates, the inclined portion 2i1 contacted to the rib 4m of the cartridge frame produces the force in the thrust direction (arrow An in FIGS. 14, 15), the thrust force being imparted on the drum 2. In this embodiment, the cartridge frame is a developing frame 4f. The rib 4m is formed on the inner surface of the frame 4f.

The other end of the housing is provided with a locking rib 2h1. The rib 2h1 is engaged with the hole 212 provided in the member 2i. By doing so, the member 2i is mounted to the housing in place. In this manner, the cylindrical member, the spring member 2h2, the thrust force producing member 2i, and the coupling 2k are integrally formed into a unit. The load producing member 2h is constructed as described above.

The members 2i, 2k, and the housing are made of plastic resin material.

In this embodiment, the peripheral surface of the cylindrical member is clenched by the spring, but the present invention is not limited to this example. For example, the rotation load may be imparted by magnetic force using magnet more by a frictional force using a friction plate.

In this embodiment, the cylindrical member has a concentric bore, but this is not limiting in the present invention. For example, it may be a solid cylinder without the bore. As described hereinbefore, the load producing member 2h is fixed to the flange 2d at the non-driving side of the photosensitive drum 2. The thrust force producing member 2i is fixed to the load producing member 2h, and the member 2i is provided with the tapered portion 2i1 at equidistant and symmetrical positions with respect to the drum shaft 2a. Such a portion of the wall (cartridge frame) of the developing container 4f as is opposed to the tapered portion 2i1 is provided with a locking rib 4m projected therefrom. The drum 2 is driven by the main assembly of the apparatus through the driving force transmitting portion 2g. By this, the drum 2 is rotated, and the cylindrical member is also rotated. The tapered portion 2i1 is engaged with the locking rib 4m. The rotating force of the drum 2 is partly converted to an urging force in the axial direction, which force urges the photosensitive drum 2 toward the end where the driving force is transmitted.

In the foregoing embodiment, the load producing member for imparting the load against the rotation of the photosensitive drum, is integral with or coupled with one end of the photosensitive drum rotation supporting member or the cartridge frame. To the opposite end, the thrust force producing member is integrally mounted to or coupled therewith, and at this end, the cartridge frame or the photosensitive drum facing the thrust force producing member is provided with a locking portion for locking with the thrust force producing member. In the locking portion, the load against the rotation of the photosensitive drum is converted into an urging force in the axial direction. Or, the said load producing member is integral with or coupled with one end of the photosensitive drum, the photosensitive drum rotation supporting member or the cartridge frame, and at the opposite end, the locking portion is integral therewith or coupled therewith. The cartridge frame or the photosensitive drum facing the locking portion is provided with the thrust force producing member. By the structure for converting the load against the rotation of the photosensitive drum to the axial driving force, the rotation and the position of the photosensitive drum are stabilized even if an external force is applied to the photosensitive drum. Therefore, color misregistration is effectively suppressed to accomplish high image quality color image formation.

As described in the foregoing, according to the embodiment of the present invention, the electrophotographic photosensitive drum can be stably rotated.

While the invention has been described with reference to the structures disclosed herein, it is not confined to the details set forth and this application is intended to cover such modifications or changes as may come within the purpose of the improvements or the scope of the following claims.

What is claimed is:

1. A process cartridge detachably mountable to a main assembly of an electrophotographic image forming apparatus, said process cartridge comprising:

an electrophotographic photosensitive drum;

process means actable on said electrophotographic photosensitive drum; and a load producing member configured and positioned to impart a load on a peripheral surface of a cylindrical member rotatable with said electrophotographic photosensitive drum to increase the rotational torque required for rotation of said electrophotographic photosensitive drums, wherein said load producing member is provided at one axial end of said electrophotographic photosensitive drum, said load producing member including a spring member configured and positioned to tighten on the peripheral surface of the cylindrical member, a housing member engaged with a cartridge frame and supporting said spring member, and an inclined portion which is configured and positioned to provide said electrophotographic photosensitive drum with a rotational load by a frictional force produced between the cylindrical member and said spring member and to contact the cartridge frame to produce a force in an axial direction.

2. A process cartridge according to claim 1, wherein the cylindrical member is provided with a central through bore through which a drum shaft of said electrophotographic photosensitive drum penetrates.

3. A process cartridge according to claim 1 or 2, wherein said load producing member includes an engaging portion configured and positioned to engage an inner surface of a flange provided at one end of said electrophotographic photosensitive drum, wherein said engaging portion contacts a part of the flange to regulate rotation, and said engaging portion is disposed at one axial end of said load producing member.

4. A process cartridge detachably mountable to a main assembly of an electrophotographic image forming apparatus, said process cartridge comprising:

an electrophotographic photosensitive drum;

process means actable on said electrophotographic photosensitive drum; and a load producing member configured and positioned to impart a load on a peripheral surface of a cylindrical member rotatable with said electrophotographic photosensitive drum to increase the rotational torque required for rotation of said electrophotographic photosensitive drum, wherein said load producing member includes a thrust force producing portion configured and positioned to impart a thrust force to said electrophotographic photosensitive drum, wherein said thrust force producing portion is disposed at an axial end of said load producing member, and the thrust force is oriented away from said load producing member in the axial direction of said electrophotographic photosensitive drum.

5. A process cartridge according to claim 4, wherein said thrust force producing portion includes an inclined portion which is inclined with respect to a rotational direction, wherein when said electrophotographic photosensitive drum is rotated, said inclined portion contacts a rib of a cartridge frame to impart the thrust force to said electrophotographic photosensitive drum.

6. A process cartridge according to claim 1 or 2, wherein said process means includes at least one of charging means for electrically charging said electrophotographic photosensitive drum, developing means for developing an electrostatic latent image formed on said electrophotographic photosensitive drum, and cleaning means for removing a developer remaining on said electrophotographic photosensitive drum.

7. A process cartridge detachably mountable to a main assembly of an electrophotographic image forming apparatus, said process cartridge comprising:

an electrophotographic photosensitive drum;

process means actable on said electrophotographic photosensitive drum;

a load producing member configured and positioned to tighten on a peripheral surface of a cylindrical member rotatable with said electrophotographic photosensitive drum to increase the rotational torque required for rotation of said electrophotographic photosensitive drum;

said load producing member including;

a spring member extending around the peripheral surface to tighten on the peripheral surface of the cylindrical member, a contact portion, provided at one axial end of said load producing member, contacting a flange which is provided at one end of said electrophotographic photosensitive drum, to rotate the cylindrical member with said electrophotographic photosensitive drum; and a thrust force producing portion, disposed at the other axial end of said load producing member, configured to impart to said electrophotographic photosensitive drum a thrust force away from said load producing member in an axial direction of said electrophotographic photosensitive drum.

8. A process cartridge according to claim 7, wherein said thrust force producing portion includes an inclined portion which is inclined with respect to a rotational direction, wherein when said electrophotographic photosensitive drum is rotated, said inclined portion contacts a rib of a cartridge frame to impart the thrust force to said electrophotographic photosensitive drum.

9. A process cartridge according to claim 7 or 8, wherein said process means includes at least one of charging means for electrically charging said electrophotographic photosensitive drum, developing means for developing an electrostatic latent image formed on said electrophotographic photosensitive drum, and cleaning means for removing a developer remaining on said electrophotographic photosensitive drum.

10. A load producing member for increasing the torque required for rotating an electrophotographic photosensitive drum usable with an electrophotographic image forming apparatus, said load producing member comprising:

a cylindrical member having a central through-hole through which a drum shaft of the electrophotographic photosensitive drum is penetratable; and a spring member extending around a peripheral surface of said cylindrical member to tighten on the peripheral surface of said cylindrical member, wherein said load producing member is provided at one axial end of the electrophotographic photosensitive drum, said load producing member further including a housing member engaged with a cartridge frame and supporting said spring member, and an inclined portion which is configured and positioned to provide the electrophotographic photosensitive drum with a rotational load by a frictional force produced between said cylindrical member and said spring member and to contact the cartridge frame to produce a force in an axial direction.

11. A load producing member according to claim 10, further comprising a contact portion, provided at one axial end of said load producing member and contacting a part of a flange provided at one end of the electrophotographic photosensitive drum, for rotation with the electrophotographic photosensitive drum.

12. A load producing member for increasing the torque required for rotating an electrophotographic photosensitive drum usable with an electrophotographic image forming apparatus, said load producing member comprising:

a cylindrical member having a central through-hole through which a drum shaft of the electrophotographic photosensitive drum is penetratable;

a spring member extending around a peripheral surface of said cylindrical member to tighten on the peripheral surface of said cylindrical member; and a thrust force producing portion, provided at the other axial end of said load producing member, and configured to impart a thrust force to said electrophotographic photosensitive drum in an axial direction of the electrophotographic photosensitive drum away from said load producing member by contact to a part of a cartridge frame when said load producing member is mounted to a process cartridge.

13. A load producing member according to claim 12, wherein said thrust force producing portion includes an inclined portion which is inclined with respect to a rotational direction, wherein when said electrophotographic photosensitive drum is rotated, said inclined portion contacts a rib of the cartridge frame to impart the thrust force to the electrophotographic photosensitive drum.

14. A load producing member for increasing the torque required for rotating an electrophotographic photosensitive drum usable with an electrophotographic image forming apparatus, said load producing member comprising:

a cylindrical member having a central through-hole through which a drum shaft of the electrophotographic photosensitive drum is penetratable;

a spring member extending around a peripheral surface of said cylindrical member to tighten on the peripheral surface of said cylindrical member;

a contact portion, provided at one axial end of said load producing member and contacting a part of a flange provided at one end of the electrophotographic photosensitive drum, for rotation with the electrophotographic photosensitive drum; and a thrust force producing portion, provided at the other axial end of said load producing member, and configured to impart a thrust force to the electrophotographic photosensitive drum in an axial direction of the electrophotographic photosensitive drum away from said load producing member by contact to a part of a cartridge frame when said load producing member is mounted to a process cartridge.

15. A load producing member according to claim 14, wherein said thrust force producing portion includes an inclined portion which is inclined with respect to a rotational direction, wherein when the electrophotographic photosensitive drum is rotated, said inclined portion contacts a rib of the cartridge frame to impart the thrust force to the electrophotographic photosensitive drum.

16. An electrophotographic image forming apparatus for forming an image on a recording material, to which a process cartridge is detachably mountable, said electrophotographic image forming apparatus comprising:

(a) a mounting portion configured and positioned to mount a process cartridge, the process cartridge including;

an electrophotographic photosensitive drum;

process means actable on the electrophotographic photosensitive drum;

a load producing member configured and positioned to impart a load on a peripheral surface of a cylindrical member rotatable with the electrophotographic photosensitive drum to increase the rotational torque required for rotation of the electrophotographic photosensitive drum, wherein the load producing member is provided at one axial end of the electrophotographic photosensitive drum, the load producing member including a spring member configured and positioned to tighten on the peripheral surface of the cylindrical member, a housing member engaged with a cartridge frame and supporting the spring member, and an inclined portion which is configured and positioned to provide the electrophotographic photosensitive drum with a rotational load by a frictional force produced between the cylindrical member and the spring member and to contact the cartridge frame to produce a force in an axial direction; and (b) feeding means for feeding the recording material.

17. An electrophotographic image forming apparatus for forming an image on a recording material, to which a process cartridge is detachably mountable, said electrophotographic image forming apparatus comprising:

(a) a mounting portion configured and positioned to mount a process cartridge, the process cartridge including:

an electrophotographic photosensitive drum;

process means actable on the electrophotographic photosensitive drum;

a load producing member configured and positioned to tighten on a peripheral surface of a cylindrical member rotatable with the electrophotographic photosensitive drum to increase the rotational torque required for rotation of the electrophotographic photosensitive drum;

the load producing member including:

a spring member extending around the peripheral surface to tighten on the peripheral surface of the cylindrical member, a contact portion, provided at one axial end of the load producing member, contacting a flange which is provided at one end of the electrophotographic photosensitive drum, to rotate the cylindrical member with the electrophotographic photosensitive drum; and a thrust force producing portion, disposed at the other axial end of the load producing member, configured to impart to the electrophotographic photosensitive drum a thrust force away from the load producing member in an axial direction of the electrophotographic photosensitive drum; and (b) feeding means for feeding the recording material.

18. An electrophotographic image forming apparatus according to claim 16 or 17, wherein said mounting portion mounts a process cartridge accommodating a yellow color developer, a process cartridge accommodating a magenta color developer, a process cartridge accommodating a cyan color developer, and a process cartridge accommodating a black color developer, in a juxtaposed relationship with each other.

19. An electrophotographic image forming apparatus according to claim 18, further comprising an intermediary transfer belt configured and positioned to transfer all together onto the recording material toner images having been formed on photosensitive drums of said process cartridges, respectively.

20. A process cartridge detachably mountable to main assembly of an electrophotographic image forming apparatus, comprising:

an electrophotographic photosensitive drum;

process means actable on said electrophotographic photosensitive drum;

a cartridge frame; and a load producing member provided at one axial end of said electrophotographic photosensitive drum, said load producing member including a cylindrical member rotatable with said electrophotographic photosensitive drum, a spring member configured and positioned to tighten on a peripheral surface of said cylindrical member, a housing member engaged with said cartridge frame and supporting said spring member, and an inclined portion which is configured and positioned to provide said electrophotographic photosensitive drum with a rotational load by a frictional force produced between said cylindrical member and said spring member and to contact said cartridge frame to produce a force in an axial direction.

21. A process cartridge according to claim 1, wherein said load producing member includes an engaging portion configured and positioned to engage with an inner surface of a flange provided at one end of said photosensitive drum, wherein said engaging portion is contacted to a part of said flange to regulate rotation, and said engaging portion is disposed at one axial end of said load producing member.

22. A process cartridge according to claim 20 or 21, wherein said process means includes at least one of charging means for electrically charging said photosensitive drum, developing means for developing an electrostatic latent image formed on said photosensitive drum, and cleaning means for removing a developer remaining on said photosensitive drum.

23. A load producing member for a process cartridge detachably mountable to a main assembly of an electrophotographic image forming apparatus, said load producing member being mountable to one axial end of an electrophotographic photosensitive drum, said load producing member comprising:

a cylindrical member for rotation with the electrophotographic photosensitive drum;

a spring member configured and positioned to tighten on a peripheral surface of said cylindrical member;

a housing member engaged with a cartridge frame and supporting said spring member; and an inclined portion which is configured and positioned to provide the electrophotographic photosensitive drum with a rotational load by a frictional force produced between said cylindrical member and said spring member and to contact the cartridge frame to produce a force in an axial direction.

24. A load producing member according to claim 23, further comprising a contact portion, provided at one axial end of said load producing member and contacting a part of a flange provided at one end of the photosensitive drum, for rotation with the photosensitive drum.

25. An electrophotographic image forming apparatus for forming an image on a recording material, to which a process cartridge is detachably mountable, said electrophotographic image forming apparatus comprising:

(a) a mounting portion configured and positioned to mount a process cartridge, the process cartridge including:

an electrophotographic photosensitive drum;

process means actable on the electrophotographic photosensitive drum;

a cartridge frame;

a load producing member provided at one axial end of the electrophotographic photosensitive drum, the load producing member including a cylindrical member rotatable with the electrophotographic photosensitive drum, a spring member configured and positioned to tighten on a peripheral surface of the cylindrical member, a housing member engaged with the cartridge frame and supporting the spring member, and an inclined portion which is configured and positioned to provide the electrophotographic photosensitive drum with a rotational load by a frictional force produced between the cylindrical member and the spring member and to contact to the cartridge frame to produce a force in an axial direction; and (b) a feeding portion configured and positioned to feed the recording material.

26. An electrophotographic image forming apparatus according to claim 25, wherein said mounting portion mounts a process cartridge accommodating a yellow color developer, a process cartridge accommodating a magenta color developer, a process cartridge accommodating a cyan color developer, and a process cartridge accommodating a black color developer, in a juxtaposed relationship with each other.

27. An electrophotographic image forming apparatus according to claim 26, further comprising an intermediary transfer belt configured and positioned to transfer all together onto the recording material toner images having been formed on the photosensitive drums of the process cartridges, respectively.

* * * * *

UNITED STATES PATENT AND TRADEMARK OFFICE
CERTIFICATE OF CORRECTION

PATENT NO. : 6,714,752 B2
DATED : March 30, 2004
INVENTOR(S) : Takahito Ueno et al.

It is certified that error appears in the above-identified patent and that said Letters Patent is hereby corrected as shown below:

Column 2,
Line 14, "cable" should read -- capable --.
Line 31, "drum" should read -- drum is stable. --.
Line 41, "giving" should read -- given that --.

Column 4,
Line 4, "a modified" should read -- modified --.
Line 34, "drum." should read -- drum). --.
Line 58, "systems" should read -- systems) --.

Column 5,
Line 16, "Various" should read -- various --.
Line 36, "and the stop" should read -- and stop --.
Line 52, "level, the" should read -- level. The --.

Column 6,
Line 6, "bearing 2c." should read -- bearing 2e. --
Line 30, "rocation" should read -- rocable --.

Column 7,
Line 11, "member" should read -- members --.
Line 12, "portion" should read -- portions -- and "is contacted" should read -- are contacted --.
Line 14, "move (rest rotate)" should read -- are moved --.
Line 44, "high--speed." should read -- high speed. --.
Line 48, "being" should read -- beam --.

Column 8,
Line 3, "is contacted" should read -- are contacted --.
Line 19, "4d," should read -- 4f, --.
Line 43, "caring" should read -- carrying --.
Line 59, "apart" should read -- separated --.

Column 9,
Line 1, "consumed the" should read -- consumed in the --.
Line 4, "the" (first occurrence) should be deleted.
Line 53, "image transfer" should read -- images transferred --.
Line 62, "approx." should read -- approximately -- and "are" should read -- is --.

UNITED STATES PATENT AND TRADEMARK OFFICE
CERTIFICATE OF CORRECTION

PATENT NO. : 6,714,752 B2
DATED : March 30, 2004
INVENTOR(S) : Takahito Ueno et al.

It is certified that error appears in the above-identified patent and that said Letters Patent is hereby corrected as shown below:

Column 10,
Line 53, "contains" should read -- contain --.

Column 11,
Line 8, "demounted," should read -- dismounted, --.
Line 42, "side plate 65." should read -- of side plate 65. --
Line 55, "hereinbelow" should read -- hereinbefore --.

Column 12,
Line 6, "members," should read -- member, --.
Line 9, "drum 2a." should read -- drum shaft 2a. --.
Line 24, "400-800 f" should read -- 400-800g f --.
Line 28, "280-560 f" should read -- 280-560g f --.
Line 62, "member 2i provided" should read -- member 2i is provided --.

Column 13,
Line 8, "1 end portion" should read -- one end portion --.
Line 55, "is" should read -- are --.

Column 14,
Line 28, "magnet more" should read -- a magnet or --.
Line 54, "there" should read -- there- --.

Column 15,
Line 41, "through bore" should read -- through-bore --.

Column 16,
Line 33, "including;" should read -- including: --.
Line 36, "member," should read -- member; --.

Column 18,
Line 18, "ing;" should read -- ing: --.
Line 61, "member," should read -- member; --.

UNITED STATES PATENT AND TRADEMARK OFFICE
CERTIFICATE OF CORRECTION

PATENT NO.   : 6,714,752 B2
DATED        : March 30, 2004
INVENTOR(S)  : Takahito Ueno et al.

It is certified that error appears in the above-identified patent and that said Letters Patent is hereby corrected as shown below:

<u>Column 19,</u>
Line 18, "transfer" should read -- transfer, --.
Line 19, material" should read -- material, --.

<u>Column 20,</u>
Line 58, "transfer" should read -- transfer, --.
Line 59, "material" should read -- material, --.

Signed and Sealed this

Fourteenth Day of September, 2004

JON W. DUDAS
*Director of the United States Patent and Trademark Office*